United States Patent [19]

Makino et al.

[11] Patent Number: 4,486,376

[45] Date of Patent: Dec. 4, 1984

[54] PROCESS FOR MODIFYING POROUS POLYMERIC MEMBRANE

[75] Inventors: Hiroshi Makino; Yoshihiro Kusuki; Takashi Harada; Hiroshi Shimazaki; Tosio Isida, all of Ichihara, Japan

[73] Assignee: Ube Industries, Ltd., Yamaguichi, Japan

[21] Appl. No.: 392,169

[22] Filed: Jun. 25, 1982

[30] Foreign Application Priority Data

Jul. 1, 1981 [JP] Japan ................................. 56-101335
Jul. 10, 1981 [JP] Japan ................................. 56-107137

[51] Int. Cl.³ .............................................. B29C 25/00
[52] U.S. Cl. ................................. 264/342 R; 264/344; 528/353
[58] Field of Search ................... 264/49, 342 R, 343, 264/344; 427/245, 246; 528/353

[56] References Cited

U.S. PATENT DOCUMENTS

| | | | |
|---|---|---|---|
| 3,228,745 | 1/1966 | Galatioto | 264/342 R |
| 3,640,829 | 2/1972 | Elton | 264/344 |
| 3,819,401 | 6/1974 | Massengale et al. | 264/342 R |
| 4,107,384 | 8/1978 | Musha et al. | 264/344 |

*Primary Examiner*—Paul Lieberman
*Assistant Examiner*—Willie Thompson
*Attorney, Agent, or Firm*—Burgess, Ryan & Wayne

[57] ABSTRACT

A modified polymeric membrane having an excellent separating property is produced by applying, to a porous polymeric membrane, a volatile treating liquid containing a modifying agent which consists of at least one member selected from:

(A) volatile dissolving organic liquids each capable of dissolving therein at least 1% by weight of the porous polymeric membrane at a temperature of 25° C.; and (B) volatile shrinking organic liquids each capable of causing the porous polymeric membrane to shrink at a shrinkage of 3% or more.

23 Claims, No Drawings

PROCESS FOR MODIFYING POROUS POLYMERIC MEMBRANE

FIELD OF THE INVENTION

The present invention relates to a process for modifying a porous polymeric membrane. More particularly, the present invention relates to a process for modifying a porous polymeric membrane, for example, a porous aromatic imide polymer membrane, so as to enhance the gas-separating property thereof.

BACKGROUND OF THE INVENTION

It is well-known that a conventional polymeric membrane comprising a dense polymeric layer and a porous polymeric layer is a so-called asymmetrical membrane and exhibits a superior permeability and separating property.

The asymmetrical membrane is prepared by spreading a dope solution containing a film-forming polymeric material on a surface of a substrate and by coagulating the resultant thin layer of the dope solution with a coagulating liquid under conditions adequate for simultaneously forming a dense layer and a porous layer. However, it is very difficult to control the coagulating conditions so as to stably produce an asymmetric membrane having both a dense layer and a porous layer in a single coagulating procedure with a satisfactory degree of reproductivity thereof.

Accordingly, a process for producing a polymeric separating membrane having an excellent separating property with a high degree of reproductivity thereof, has been greatly desired by industry.

SUMMARY OF THE INVENTION

An object of the present invention is to provide a process for modifying a porous polymeric membrane so as to enhance the separating property of the membrane.

Another object of the present invention is to provide a process for modifying a porous polymeric membrane with a high degree of reproductivity thereof.

The above-mentioned objects can be attained by the process of the present invention for modifying a porous polymeric membrane, which process comprises:
  applying a volatile treating liquid containing a modifying agent to at least one surface of a porous polymeric membrane; and
  Gradually evaporating said treating liquid from said porous polymeric membrane by means of a drying and/or heating procedure,
  the modifying agent being imparted in an amount of 0.1 to 30%, based on the weight of said porous polymeric membrane, thereto and consisting of at least one member selected from the group consisting of:
  (A) volatile, dissolving organic liquids each capable of dissolving therein at least approximately 1% by weight of the polymeric material of which the porous polymeric membrane consists, at a temperature of 25° C.; and
  (B) volatile shrinking organic liquids each capable of causing the porous polymeric membrane to shrink at a shrinkage of at least approximately 3% when the porous polymeric membrane is impregnated with the shrinking organic liquid and then is dried.

The process of the present invention is definitely different from conventional separating membrane-producing processes and can modify a conventional porous polymeric membrane to a polymeric membrane having a satisfactory gas-or liquid-permeating property and an excellent separating property with a high degree of reproductivity thereof.

The process of the present invention is adequate especially for modifying porous, heat-resistant polymeric membranes consisting of an aromatic imide polymer or an aromatic polysulfone.

The resultant modified polymeric membrane in accordance with the process of the present invention is useful as a gas- or liquid-separating membrane or a gas- or liquid-concentrating membrane.

DETAILED DESCRIPTION OF THE INVENTION

In the process of the present invention, a porous polymeric membrane is treated with a treating liquid containing a modifying agent.

The porous polymeric membrane usable for the process of the present invention preferably exhibits a hydrogen gas permeability ($PH_2$) of $1 \times 10^{-1}$ to $1 \times 10^{-6}$ cm$^3$/cm$^2$·sec·cmHg, more preferably $5 \times 10^{-1}$ to $5 \times 10^{-5}$ cm$^3$/cm$^2$·sec·cmHg, and a ratio ($PH_2/PCO$) of the hydrogen gas permeability ($PH_2$) to the carbon monoxide gas permeability ($PCO$) of 1.5 to 5.0, more preferably 2 to 4.5. The gas permeability is determined by the method described in detail hereinafter.

The porous polymeric membrane may be in the form of a flat film or a hollow fiber or tube.

The porous polymeric membrane may comprise at least one polymer selected from the group consisting of polyimides, especially aromatic imide polymer, polysulfones, especially aromatic polyesterpolysulfones, polyamides, polyimideamide, polycarbonates, polyesters, for example, polyethylene terephthalate, polyethers, cellulose derivatives, for example, methyl cellulose, ethyl cellulose and nitric cellulose, and vinyl polymers, for example, polyvinyl pyridine and polyvinyl alcohol.

The polyimide usable for the present invention may be selected from aromatic imide polymers comprising at least 80 molar %, preferably at least 90 molar %, of at least one type of recurring unit selected from the group consisting of those of the formulae (I) and (II):

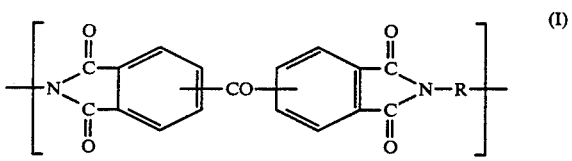

and

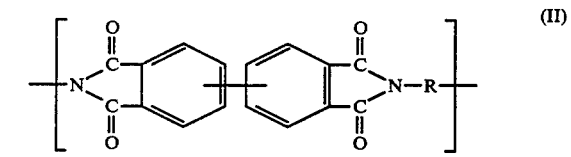

wherein R represents a divalent aromatic radical.

The aromatic imide polymer is preferably soluble in an amount of 3% by weight, more preferably 5% by weight, in a solvent consisting essentially of at least one phenol-type liquid compound.

The aromatic imide polymer usable for the process of the present invention preferably exhibits a logarithmic viscosity of from 0.3 to 7.0, more preferably 0.4 to 5.0 and still more preferably 0.5 to 4.0, determined at a concentration of 0.5 g per 100 ml of a solvent consisting of a mixture of four parts by weight of para-chlorophenol and one part by weight of ortho-chlorophenol, at a temperature of 30° C.

The divalent aromatic radical represented by R in the formulae (I) and (II) may be selected from those of the formulae (III), (IV), (V), and (VI):

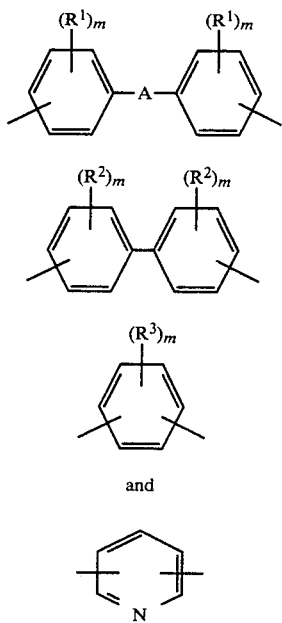

wherein $R^1$, $R^2$, and $R^3$ represent, independently from each other, a member selected from the group consisting of a hydrogen atom, lower alkyl radicals having 1 to 3 carbon atoms, and lower alkoxyl radicals having 1 to 3 carbon atoms; A represents a divalent linking radical selected from the class consisting of —O—, —S—, —CO—, —OS$_2$—, —SO—, —CH$_2$—, and —C(CH$_3$)$_2$—; and m represents an integer of from 1 to 4.

The aromatic imide polymer usable for the present invention is prepared by the polymerization and imidization of equimolar amounts of an aromatic tetracarboxylic acid component and an aromatic diamine component.

The aromatic tetracarboxylic acid component consists essentially of at least one member selected from the group consisting of biphenyl tetracarboxylic acids, for example, 3,3',4,4'-biphenyl tetracarboxylic acid, and 2,3,3',4'-biphenyl tetracarboxylic acid, and benzophenone tetracarboxylic acids, for example, 3,3',4,4'-benzophenone tetracarboxylic acid and 2,3,3',4'-benzophenone tetracarboxylic acid, and anhydrides, salts, and esters of the above-mentioned acids.

The tetracarboxylic acid compounds preferable for the present invention are 3,3',4,4'-biphenyl tetracarboxylic dianhydride, 2,3,3',4'-biphenyl tetracarboxylic dianhydride, 3,3',4,4'-benzophenone tetracarboxylic dianhydride, and 2,3,3',4'-benzophenone tetracarboxylic dianhydride.

The aromatic tetracarboxylic acid component may contain 20 molar % or less of at least one additional tetracarboxylic acid compound selected from the group consisting of pyromellitic acid, 2,2-bis (3,4-dicarboxyphenyl) propane, 2,2-bis (3,4-dicarboxyphenyl) methane, 2,2-bis (3,4-dicarboxyphenyl) sulfone, 2,2-bis (3,4-dicarboxyphenyl) ether, 2,2-bis (3,4-dicarboxyphenyl) thioether, and anhydrides, salts, and esters of the above-mentioned acids.

The aromatic diamine component usable for the process of the present invention comprises at least one compound of the formula H$_2$N-R-NH$_2$ selected from the group consisting of diamino diphenyl ethers, for example, 4,4'-diaminodiphenyl ether, 3,3'-dimethoxy-4,4'-diaminodiphenyl ether, 3,3'-dimethyl-4,4'-diaminodiphenyl ether, 3,3'-diaminodiphenyl ether, and 3,4'-diaminodiphenyl ether; diaminodiphenyl thioethers, for example, 4,4'-diaminodiphenyl thioether, 3,3'-dimethyl-4,4'-diaminodiphenyl thioether, 3,3'-dimethoxy-4,4'-diaminodiphenyl thioether, and 3,3'-diaminodiphenyl thioether; diaminobenzophenones, for example, 4,4'-diaminobenzophenone, 3,3'-dimethyl-4,4'-diaminobenzophenone, and 3,3'-diaminobenzophenone; diaminodiphenyl methanes, for example, 3,3'-diaminodiphenyl methane, 4,4'-diaminodiphenyl methane, and 3,3'-dimethoxy-4,4'-diaminodiphenyl methane; diaminodiphenyl propanes, for example, 2,2-bis (4-aminophenyl) propane and 2,2-bis (3-aminophenyl) propane; diaminodiphenyl sulfones, for example, 4,4'-diaminodiphenyl sulfone and 3,3'-diaminodiphenyl sulfone; diaminodiphenyl sulfoxides, for example, 4,4'-diaminodiphenyl sulfoxide and 3,3'-diaminodiphenyl sulfoxide; diphenyl diamines, for example, 3,3'-dimethyl benzidine, 3,3'-dimethoxybenzidine, and 3,3'-diaminobiphenyl; diaminobenzenes, that is, ortho-, meta-, and para-diaminobenzenes; and diaminopyridines, that is, 2,6-, 3,6-, and 2,5-diaminopyridines.

The porous aromatic imide polymer membrane can be produced in such a manner that a polyamic acid which has been produced by the polymerization of the aromatic tetracarboxylic acid component and the aromatic diamine component, or an imide polymer which has been produced by the polymerization and imidization of the above-mentioned two components, is uniformly dissolved in an organic solvent to provide a dope solution; the dope solution is spread on a surface of a substrate; the resultant thin layer of the dope solution is coagulated in a coagulating liquid containing, as a principal component, water and/or a lower aliphatic alcohol to form a semi-permeable membrane, the semi-permeable membrane is impregnated with a solvent having a solubility parameter of 9.3 or less, the impregnated semi-permeable membrane is dried and/or heated to evaporate the solvent and, optionally, the dried membrane is heated at an elevated temperature so as to imidize the polyamic acid into the corresponding imide polymer.

In another method for producing the porous aromatic imide polymer membrane, the polyamic acid or the aromatic imide polymer is homogeneously dissolved in a solvent comprising a mixture of an organic polar solvent capable of dissolving therein the polymer and a small amount of an organic liquid having a high boiling point and being incapable of dissolving therein the polymer; the resultant dope solution is converted to a thin layer thereof; the thin layer of the dope solution is dried and/or heated to gradually evaporate the solvent and, if necessary, is heated at an elevated temperature so as to imidize the polyamic acid into the corresponding imide polymer.

In the process of the present invention, the porous polymeric membrane is treated with a treating liquid containing a specific modifying agent. In this treatment, it is important that the modifying agent be imparted in an amount of 0.1% to 50% by weight, preferably 0.5% to 30% by weight and more preferably 1% to 20% by weight, based on the weight of the porous polymeric membrane, to the porous polymeric membrane. When the amount of the modifying agent imparted to the porous polymeric membrane is less than 0.1%, it is difficult to attain the purpose of the present invention. Also, if the amount of the modifying agent is more than 50%, it is difficult to obtain a modified membrane which is usable as a separating membrane.

The treating liquid can be applied to the porous polymeric membrane by means of any conventional method, for example, by impregnating the porous polymeric membrane with the treating liquid; by coating at least one surface of the porous polymeric membrane with the treating liquid by using any conventional coating means, for example, a coating roll, coating blade, or coating brush; by causing the porous polymeric membrane to absorb the vapor of the treating liquid; by spraying the treating liquid on to at least one surface of the porous polymeric membrane.

The application of the treating liquid to the porous polymeric membrane is preferably carried out by immersing the porous polymeric membrane in a treating liquid comprising a mixture of 0.5 to 40 parts by weight of the modifying agent with 100 parts by weight of an additional organic liquid consisting of at least one non-dissolving organic liquid compound which is compatible with the modifying agent but is incapable of dissolving therein the porous polymeric membrane and which has a boiling point lower than that of the modifying agent. In another preferable application of the treating liquid to the porous polymeric membrane is carried out by impregnating the porous polymeric membrane with an organic liquid consisting of at least one volatile liquid compound which is compatible with the modifying agent but is incapable of dissolving therein the porous polymeric membrane and which has a boiling point lower than that of the modifying agent and then by immersing the impregnated porous polymeric membrane in the treating liquid consisting of the modifying agent alone so as to replace the organic liquid with the modifying agent.

In the case where the porous polymeric membrane to be treated consists of at least one aromatic imide polymer, it is preferable that the dissolving organic liquid (A) be selected from phenol compounds having a freezing point of 100° C. less and a boiling point of from 150° to 300° C. under the ambient pressure. The phenol compound is selected preferably from the group consisting of phenol; alkyl-substituted phenol compounds, for example, ortho-, meta-, and para-cresols, 3,5-xylenol, carvocrol and thymol; and halogenated phenol compounds, for example, 3-chlorophenol, 4-chlorophenol, 3-bromophenol, 4-bromophenol, 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-5-hydroxytoluene, 3-bromo-6-hydroxytoluene, and 4-bromo-2-hydroxytoluene.

Also, in the case of the aromatic imide polymer porous membrane, it is preferably that the shrinking organic liquid (B) be selected from the group consisting of dimethylformamide, diethylformamide, dimethylacetamide, diethylacetamide, N-methyl-2-pyrrolidone, α-chloronaphthalene, nitrobenzene, tetrachlorobenzene, aniline, alkyl benzenes having at least one alkyl substituent having 1 to 6 carbon atoms; halogenated benzenes having 1 to 2 halogen substituents; cycloaliphatic alcohols having 5 to 8 carbon atoms; and cycloaliphatic ketones having 5 to 8 carbon atoms. The alkyl benzene may be selected from toluene, xylene, and ethyl benzene. The halogenated benzene may be selected from chlorobenzene, bromobenzene, dichlorobenzenes, and dibromobenzenes. The cycloaliphatic alcohol may be cyclohexanol or cyclopentanol, and the cycloaliphatic ketone may be cyclohexanone or cyclopentanone.

The porous polymeric membrane usable for the present invention may consist of at least one polysulfone. The polysulfone may be selected from polyarylsulfones which are produced, for example, by polymerizing disodium salt of bisphenol A and p, p'-dichlorodiphenyl sulfone and comprises at least 80 molar % of the recurring unit of the formula (VII):

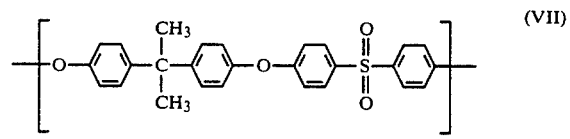

In the case where the porous polymeric membrane consists of at least one polysulfone, for example, having the recurring unit of the formula (VII), it is preferable that the dissolving organic liquid (A) be selected from the group consisting of dichloromethane, dichloroethane, chloroform, tetrachloroethylene, tetrachloroethane, cyclohexanone, chlorobenzene, N-methyl-2-pyrrolidone, dimechylformamide, and dimethylacetamide. Also, it is preferably that the shrinking organic liquid (B) for the porous polysulfone membrane be selected from the group consisting of benzene, toluene, xylene, acetone, and methylethyl ketone.

The treating liquid to be applied to the porous polymeric membrane may consist of the modifying agent alone or may comprise a mixture of 0.5 to 40 parts by weight, preferably 1 to 30 parts by weight, of the modifying agent with 100 parts by weight of an additional organic liquid consisting of at least one non-dissolving organic liquid compound which is compatible with the modifying agent but is incapable of dissolving the porous polymeric membrane and which has a boiling point thereof lower than that of the modifying agent.

The above-mentioned mixed treating liquid can be applied to the porous polymeric membrane in such a manner that the porous polymeric membrane is immersed in the mixed treating liquid for an adequate time and then is removed from the mixed treating liquid; the removed porous polymeric membrane is subjected to an evaporating procedure in which the additional organic liquid having a lower boiling point thereof is selectively removed so as to obtain a porous membrane impregnated with the modifying agent.

In the case where the porous polymeric membrane consists of at least one aromatic imide polymer, it is preferable that the non-dissolving organic liquid compound be selected from the group consisting of benzene, cyclohexane, cyclopentane, n-pentane, n-hexane, n-heptane, n-octane, methyl alcohol, ethyl alcohol, propyl alcohols, butyl alcohols, methyl ketone, ethyl ketone, methylethyl ketone, methyl-isopropyl ketone, methyl-isoamyl ketone, methyl acetate, ethyl acetate, propyl acetate, and butyl propionate.

In the process of the present invention, the porous polymeric membrane containing the treating liquid is subjected to an evaporating procedure in which the treating liquid is gradually evaporated from the porous polymeric membrane by drying or heating, so as to modify the porous polymeric membrane.

The evaporation procedure is carried out in three stages, that is, first, at a temperature of from 5° to 80° C. for 0.1 to 100 hours; second, at a temperature of 80° to 160° C. for 0.1 to 20 hours; and, finally, at a temperature of 160° to 300° C. for 0.1 to 20 hours, under the ambient pressure. It is preferable that the drying and/or heating procedure at a temperature of 160° C. or less be carried out for at least 0.3 hours, more preferably at least 0.5 hours, so as to gradually evaporate the treating liquid, and thereafter, the dried porous polymeric membrane is heated at a temperature of 160° to 300° C.

Usually, it is preferably that the drying and/or heating procedure be carried out to an extent that the resultant modified porous polymeric membrane contains 0 to 10% by weight of the residual modifying agent. Especially, in the case where the porous polymeric membrane comprises the aromatic imide polymer having the recurring unit of the formula (I), it is important that the amount of the residual modifying agent consisting of the shrinking organic liquid (B) alone in the modified porous polymeric membrane be controlled to a level of 10% by weight or less, more preferably 1% to 7% by weight.

The drying and/or heating procedure may be carried out in the ambient atmosphere or in an inert gas (for example, nitrogen gas) atmosphere.

The modified porous polymeric membrane in accordance with the process of the present invention preferably exhibits of hydrogen gas permeability (PH$_2$) of $1\times10^{-3}$ to $5\times10^{-7}$, cm$^3$/cm$^2$.sec.cmHg, more preferably $1\times10^{-4}$ to $1\times10^{-7}$ cm$^3$/cm$^2$.sec.cmHg, and a ratio (PH$_2$/PCO) of the hydrogen gas permeability (PH$_2$) to the carbon monoxide gas-permeability (PCO) of 6 to 60, more preferably 8 to 60 and still more preferably 10 to 40.

The modified porous polymeric membrane produced in accordance with the process of the present invention is usable not only as a gas or liquid-separating or -concentrating membrane but also as a reverse osmotic membrane which is capable of excluding sodium chloride from a sodium chloride aqueous solution.

The modified porous polymeric membrane may be in the form of a flat film or a flat, hollow fiber or tube.

SPECIFIC EXAMPLES

The specific examples presented below will serve to more fully show how the present invention can be practically used. However, it should be understood that the examples are only illustrative and in no way limit the scope of the present invention.

In the following examples, the gas permeability of the modified polymeric membrane was determined by the following gas transmission test. In the test, a membrane to be tested was placed in a stainless steel cell having a permeating area of 14.65 cm$^2$, and a gas was supplied to the cell under a pressure of 0.5 to 3 kg/cm$^2$G at a temperature of 25° C. The amount (volume) of the gas passed through the membrane was measured by using a flow meter.

The gas permeability (P) of the gas tested was calculated from the following equation:

Gas permeability (P)
(cm$^3$/cm$^2$·sec·cmHg) $= X/(A\times T\times D)$ where X represents the amount (volume) in cm$^3$ (STP) of the gas passed through the membrane, A represents the permeating surface area in cm$^2$ of the membrane through which the gas passed, T represents the transmission time in seconds of the gas passed through the membrane, and D represents the difference in pressure in cmHg between the gas supply side and the opposite side of the membrane.

The reverse osmosis test for the membrane was carried out in the following manner.

A membrane was placed in a reverse osmosis testing apparatus. An aqueous solution of 0.5% by weight of sodium chloride was supplied to the apparatus so as to carry out a reverse osmosis procedure at a temperature of 20° C. under a pressure of 40 kg/cm$^2$. The permeating rate, in m$^3$/m$^2$·day, of water permeated through the membrane was measured. The exclusion (Rj) in % of sodium chloride was determined in accordance with the following equation:

$$Rj = (1-(C/C_0)\times 100 \ (\%)$$

wherein $C_0$ represents the concentration of sodium chloride in the original aqueous solution and C represents the concentration of sodium chloride in the aqueous solution passed through the membrane.

The logarithmic viscosity of a polymer was determined by the following method.

In the case of an imide polymer, the polymer was dissolved at a concentration of 0.5 g in 100 ml of para-chlorophenol. The viscosity of the solution was measured at a temperature of 50° C. In another method, the imide polymer was dissolved at a concentration of 0.5 g in 100 ml of a mixture of 4 parts by volume of para-chlorophenol and one part by volume of ortho-chlorophenol. The viscosity of the solution was measured at a temperature of 30° C.

The measured value of the viscosity of the solution was converted into the logarithmic (inherent) viscosity of the polymer in accordance with the following equation:

$$\text{Logarithmic viscosity } (\eta) = \frac{\text{Natural logarithm}\left(\frac{\text{viscosity of solution}}{\text{viscosity of solvent}}\right)}{\text{Concentration of polymer in solution}}$$

The degree of imidization of an imide polymer was determined in such a manner that an imide polymer in the form of fine particles was subjected to infrared-ray absorption spectrum analysis to determine the amount of the imide structure in the imide polymer from the height of the absorption peaks at 1780 cm$^{-1}$ and 720 cm$^{-1}$.

EXAMPLE 1

A separable flask equipped with a stirrer and a conduit for introducing thereinto nitrogen gas was charged with a mixture of 40 millimoles of 3,3',4,4'—biphenyl tetracarbonylic dianhydride, 40 millimoles of 4.4'—diaminodiphenyl ether, and 198 g of para-chlorophenol. The mixture was subjected to a single-step polymerization-imidization procedure in which the temperature of the mixture was elevated from room temperature to 180° C. over a period of approximately 50 minutes and was maintained at this level for 8 hours. A viscous polyimide solution was obtained. The polyimide solution contained 10% by weight of the polyimide, and the resultant polyimide was of a degree of imidization of 95% or more and exhibited a logarithmic viscosity of 2.2 determined at a concentration of 0.5 g per 100 ml of para-chlorophenol at a temperature of 50° C.

The polyimide dope solution prepared in the above-mentioned manner was spread on a smooth surface of a horizontal glass plate at a temperature of 25° C. to form a thin layer of the dope solution having a thickness of 0.2 mm.

The thin layer of dope solution was immersed in a coagulating liquid consisting of methyl alcohol alone at a temperature of 25° C. for approximately 20 hours to provide a semi-permeable membrane. The resultant membrane was immersed in n-hexane for 20 hours and then was removed from the n-hexane, was dried at a temperature of 30° C. for 20 minutes while blowing air into the drying apparatus and then at a temperature of 100° C. for one hour, and, finally, was heated at a temperature of 200° C. for 3 hours to provide an aromatic imide polymer porous membrane.

The resultant porous membrane had a thickness of 25 micron and exhibited a hydrogen gas permeability ($PH_2$) of $1.8 \times 10^{-2}$ $cm^2 \cdot sec \cdot cmHgO$ and a ratio ($PH_2/PCO$) of the hydrogen gas permeability ($PH_2$) to the carbon monoxide gas permeability (PCO) of 3.2.

The aromatic imide polymer porous membrane was immersed in a treating liquid consisting of a mixture of 100 parts by weight of benzene (additional liquid) with 2.93 parts by weight of para-chlorophenol (dissolving liquid (A)) at a temperature of 25° C. for 20 minutes so as to impregnate the porous membrane with the treating liquid. The porous membrane impregnated with the treating liquid contained 1.9% of the para-chlorophenol based on the weight of the membrane. The impregnated porous membrane was dried at a temperature of 25° C. for 2 hours while blowing air into the drying apparatus and then was heated at a temperature of 200° C. for 2 hours, so as to gradually evaporate the treating liquid. The resultant modified membrane contained substantially no para-chlorophenol.

The results of the gas-permeating test and the reverse osmosis test applied to the modified membrane and the original (non-modified) membrane as indicated in Table 1.

EXAMPLE 2

The same procedures as those described in Example 1 were carried out except that the treating liquid consisted of a mixture of 100 parts by weight of benzene and 4.44 parts by weight of para-chlorophenol; and the porous membrane impregnated with the treating liquid contained 3.6%, based on the weight of the membrane, of para-chlorophenol, and the drying time of the impregnated porous membrane at a temperature of 25° C. while blowing air into the drying apparatus was changed to 96 hours.

The results of the tests applied to the modified membrane are shown in Table 1.

EXAMPLE 3

The same procedures as those described in Example 1 were carried out with the following exceptions:
A. The treating liquid consisted of a mixture of 100 parts by weight of benzene and 7.55 parts by weight of para-chlorophenol.
B. The porous membrane impregnated with the treating liquid contained 5.8% of para-chlorophenol, based on the weight of the porous membrane.
C. The drying time of the impregnated porous membrane at a temperature of 25° C. while blowing air into the drying apparatus was changed to 60 hours.
D. No heating procedure was applied to the dried porous membrane.

The results of the gas-permeating test applied to the modified polyimide membrane are indicated in Table 1.

TABLE 1

| | Modifying treatment | | | Gas-permeating test | | Reverse osmosis test | |
| | Amount of modifying agent (PCP(*)²) (parts | Drying and heating time (hr) | | | Separating property | Water-permeating rate | Exclusion of NaCl |
| Example No. | by wt) | 25° C. | 200° C. | $H_2$ permeability ($cm^3/cm^2 \cdot sec \cdot cmHg$) | $PH_2/PCO$ | ($m^3/m^2 \cdot day$) | (%) |
|---|---|---|---|---|---|---|---|
| Control(*)¹ | — | 0 | 0 | $1.8 \times 10^{-2}$ | 3.2 | 3.1 | 0 |
| 1 | 2.93 | 2 | 2 | $7.1 \times 10^{-6}$ | 21 | $5.3 \times 10^{-3}$ | 32 |
| 2 | 4.44 | 96 | 2 | $2.0 \times 10^{-5}$ | 27 | $6.9 \times 10^{-3}$ | 27 |
| 3 | 7.55 | 60 | 0 | $7.4 \times 10^{-6}$ | 11 | — | — |

Note:
(*)¹The non-modified imide polymer membrane described in Example 1 was used
(*)²Para-chlorophenol
Para-chlorophenol was able to dissolve therein 20% by weight or more of the polyimide.

EXAMPLE 4

The same procedures as those described in Example 1 were carried out with the following exceptions:
A. The treating liquid consisted of a mixture of 100 parts by weight of benzene and 5.26 parts by weight of N-methyl-2-pyrrolidone (shrinking liquid (B)).
B. The porous membrane impregnated with the treating liquid contained 4.5% of N-methyl-2-pyrrolidone, based on the weight of the porous membrane.
C. The drying time of the impregnated porous membrane at a temperature of 25° C. while blowing air into the drying apparatus was changed to 16 hours.
D. The heating procedure was carried out at a temperature of 100° C. for 2 hours and then at a temperature of 200° C. for 2 hours.

The results of the gas-permeating test applied to the modified imide polymer membrane are indicated in Table 2.

EXAMPLE 5

The same procedures as those described in Example 4 were carried out except that the treating liquid consisted of 100 parts by weight of benzene and 11.1 parts by weight of -chloronaphthalene and the porous membrane impregnated with the treating liquid contained 7.8% of α-chloronaphthalene (shrinking liquid (B)), based on the weight of the porous membrane.

The results of the gas-permeating test applied to the resultant modified porous membrane are shown in Table 2.

TABLE 2

| Example No. | Modifying agent Type | Concentration in treating liquid (part by wt) | Drying and heating time (hr) 25° C. | 100° C. | 200° C. | Gas-permeating test $H_2$ Permeability $(cm^3/cm^2 \cdot sec \cdot cmHg)$ | $PH_2/PCO$ |
|---|---|---|---|---|---|---|---|
| 4 | N—methyl-2-pyrrolidone | 5.26 | 16 | 2 | 2 | $1.9 \times 10^{-5}$ | 14 |
| 5 | α-chloronaph-thalene | 11.1 | 16 | 2 | 2 | $5.1 \times 10^{-5}$ | 9.8 |

When the porous polyimide membrane was impregnated with the modifying agent and dried and heated under the same conditions as those described in Example 4, the shrinkage of the porous polyimide membrane was as follows:

| Modifying agent | Shrinkage (%) |
|---|---|
| N—methyl-2-pyrrolidone | 32 |
| α-chloronaphthalene | 18 |

EXAMPLE 6

The same type of separable flask as that described in Example 1 was charged with a mixture of 57.4 millimoles of 3, 3', 4, 4'-benzophenone tetracarboxylic dianhydride (BTDA), 57.4 millimoles of 4,4'-diaminodiphenyl ether (DADE), and 270 g of N-methyl-2-pyrrolidone. The mixture was heated at a temperature of 20° C. for 2 hours while being constantly stirred and while flowing nitrogen gas through the flask to produce a polyamic acid. Thereafter, 200 g of N-methyl-2-pyrrolidone, 27.5 g of pyridine, and 35.5 g of acetic anhydride were added to the polymerization mixture, and the temperature of the resultant admixture was raised gradually to 80° C. while the admixture was vigorously stirred and then was maintained at 80° C. for one hour so as to imidize the polyamic acid. The resultant polyimide solution was mixed with a large amount of methyl alcohol to allow the polyimide to completely precipitate from the solution. The precipitated polyimide was isolated by means of filtration, was washed with methyl alcohol, and, finally, was dried. A polyimide powder was obtained.

The resultant polyimide exhibited a logarithmic viscosity of 1.1, determined by using a solvent consisting of 4 parts by volume of para-chlorophenol and one part by volume of ortho-chlorophenol at 30° C., and a degree of imidization of 95% or more.

A mixture of 10 g of the polyimide powder and 90 g of para-chlorophenol (PCP) was placed in a flask with a stirrer and heated at approximately 100° C., while the mixture being constantly stirred, to provide a homogeneous solution of the polyimide. The solution was filtered and degassed at a temperature of approximately 80° C.

The resultant dope solution was subjected to the same procedure for preparing the porous polyimide membrane as that described in Example 1.

The porous polyimide membrane was modified in the same manner as that described in Example 3 except that (1) the porous membrane impregnated with the treating liquid contained 6.1% of para-chlorophenol, based on the weight of the membrane, and (2) the impregnated porous membrane was dried at a temperature of 25° C. for 16 hours while air is blown into the drying apparatus, and was heated at a temperature of 100° C. for 2 hours and then at a temperature of 200° C. for 2 hours.

The results of the gas-permeating test applied to the non-modified polyimide membrane (control) and the modified polyimide membrane as shown in Table 3.

TABLE 3

| Example No. | Modifying agent Type | Concentration in treating liquid (part by wt) | Drying and heating time (hr) 25° C. | 100° C. | 200° C. | Gas-permeating test $H_2$ permeability $(cm^3/cm^2 \cdot sec \cdot cmHg)$ | $PH_2/PCO$ |
|---|---|---|---|---|---|---|---|
| Control | — | — | — | — | — | $8.7 \times 10^{-3}$ | 2.8 |
| Example 6 | PCP | 7.55 | 16 | 2 | 2 | $1.1 \times 10^{-5}$ | 19 |

Note:
Para-chlorophenol was able to dissolve therein 30% by weight or more of the polyimide.

EXAMPLE 7

A dope solution was prepared by dissolving, in a concentration of 25% by weight, a polysulfone (produced under the trademark of P-3500 by Union Carbide Corporation) in dimethylformamide. The dope solution was spread on a smooth surface of a horizontal glass plate at a temperature of 25° C. to form a thin layer of the dope solution having a thickness of 0.2 mm. The thin layer of the dope solution was immersed in a coagulating liquid consisting of an aqueous solution containing 2% by weight of dimethylformamide and 0.5% by weight of sodium lauryl sulfate. The resultant semipermeable membrane was washed with water and was dried at a temperature of 25° C. for 20 hours while blowing air. A porous polysulfone membrane was obtained.

The porous polysulfone membrane was immersed in a treating liquid consisting of a mixture of 100 parts by weight of methyl alcohol (additional liquid) and 2.0 parts by weight of dimethyl formamide (dissolving liquid (A)). The resultant porous polysulfone membrane impregnated with the treating liquid contained 1.2% of dimethylformamide. The impregnated porous polysulfone membrane was dried at a temperature of 25° C. for 18 hours which air is blown into the drying apparatus.

The results of the gas-permeating test applied to the non-modified membrane (control) and the modified membrane are shown in Table 4.

EXAMPLE 8

The same procedures as those described in Example 7 were carried out except that in the modifying procedure, the porous polysulfone membrane was additionally dried at a temperature of 100° C. for 0.5 hour. The results of the gas-permeating test applied to the modified polysulfone membrane are indicated in Table 4.

EXAMPLES 10 THROUGH 12

In each of the Examples 10 through 12, the same porous membrane-producing procedure as that described in Example 1 was repeated.

The resultant porous polyimide membrane was immersed in n-hexane at a temperature of 25° C. for 20 minutes, was removed from the n-hexane bath, and was immersed in the treating liquid consisting of only the type of modifying agent indicated in Table 5 at a temperature of 25° C. under a reduced pressure for 20 minutes. When the porous membrane was removed from the treating liquid bath, the porous membrane contained 26% (Example 10), 28% (Example 11), or 24% (Example 12) of the modifying agent, based on the weight of the membrane. The porous membrane impregnated with the treating liquid was dried by blowing air at room temperature for 2 hours and was heated at a temperature of 100° C. for one hour and then at a temperature of 200° C. for 2 hours. The modified membrane contained the residual modifying agent in the amount indicated in Table 5.

TABLE 5

| | Modifying agent | Amount of residual modifying agent contained in modified membrane | Gas permeability | | | |
|---|---|---|---|---|---|---|
| Example No. | Type | | $H_2$ permeability $(cm^3/cm^2 \cdot sec \cdot cmHg)$ | $PH_2/PCO$ | $O_2$ permeability $(cm^3/cm^2 \cdot sec \cdot cmHg)$ | $PO_2/PN_2$ |
| 10 | Xylene | 2% | $1.3 \times 10^{-5}$ | 54 | — | — |
| 11 | Ortho-di-chlorobenzene | 4% | $1.2 \times 10^{-5}$ | 10 | $9.8 \times 10^{-6}$ | 3.5 |
| 12 | Cyclohexanol | 5% | $6.8 \times 10^{-6}$ | 8.1 | — | — |
| Control | — | " | $7.2 \times 10^{-3}$ | 3.0 | $2.1 \times 10^{-3}$ | 0.9 |

EXAMPLE 9

The same procedures as those described in Example 8 were carried out except that the treating liquid consisted of 100 parts by weight of methyl alcohol and 2.0 parts by weight of ortho-dichlorobenzene (dissolving liquid (A)), and the impregnated porous membrane contained 1.7% of ortho-dichlorobenzene, based on the weight of the membrane.

The results of the gas-permeating test applied to the modified polysulfone membrane are indicated in Table 4.

When the porous polyimide membrane was impregnated with the modifying agent and dried and heated under the same conditions as those described in Examples 10 through 12, the shrinkage of the membrane was as indicated below.

| Modifying agent | Shrinkage (%) |
|---|---|
| Xylene | 8.0 |
| Ortho-dichlorobenzene | 7.7 |
| Cyclohexanol | 7.9 |

TABLE 4

| | Modifying agent | | Drying and heating time (hr) | | | Gas-permeating test | |
|---|---|---|---|---|---|---|---|
| Example No. | Type | Concentration in treating liquid (part by wt.) | 25° C. | 100° C. | 200° C. | $H_2$ permeability $(cm^3/cm^2 \cdot sec \cdot cmHg)$ | $PH_2/PCO$ |
| Control | — | — | — | — | — | $3.1 \times 10^{-4}$ | 3.1 |
| 7 | Dimethyl-formamide | 2.0 | 18 | — | — | $4.5 \times 10^{-5}$ | 19 |
| 8 | Dimethyl-formamide | 2.0 | 18 | 0.5 | — | $8.3 \times 10^{-5}$ | 21 |
| 9 | Ortho-dichloro-benzene | 2.0 | 18 | 0.5 | — | $6.1 \times 10^{-5}$ | 15 |

Dimethylformamide and ortho-dichlorobenzene could dissolve therein 30% by weight or more of the above-mentioned polysulfone.

We claim:
1. A process for modifying a porous membrane, comprising:
   impregnating at least one surface portion of a porous polymeric membrane with a volatile treating liquid containing a modifying agent; and gradually evaporating said treating liquid from said porous polymeric membrane, said modifying agent being imparted in an amount of 0.1% to 50%, based on the weight of said porous polymeric membrane, thereto and consisting essentially of at least one member selected from the group consisting of:

(A) volatile, dissolving organic liquids each capable of dissolving therein at least approximately 1% by weight of the polymeric material of which said porous polymeric membrane consists at a temperature of 25° C.; and (B) volatile shrinking organic liquids each capable of causing said porous polymeric membrane to shrink at a shrinkage of at least approximately 3% when said porous polymeric membrane is impregnated with said shrinking organic liquid and the liquid evaporated.

2. The process as claimed in claim 1, wherein said porous polymeric membrane exhibits a hydrogen gas permeability ($H_2$) of from $1 \times 10^{-1}$ to $1 \times 10^{-6}$ cm$^3$/cm$^2$.sec.cmHg and a ratio ($H_2$/CO) of the hydrogen gas-permeability ($H_2$) to the carbon monoxide gas-permeability (CO) of from 1.5 to 5.

3. The process as claimed in claim 1, wherein said porous polymeric membrane comprises at least one polymer selected from the group consisting of polyimides and polysulfones.

4. The process as claimed in claim 3, wherein said polyimides are selected from aromatic imide polymers.

5. The process as claimed in claim 4, wherein said aromatic imide polymers are selected from those comprising at least 80 molar % of at least one recurring unit selected from the group consisting of those of the formulae (I) and (II):

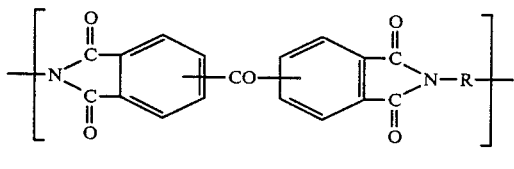

and

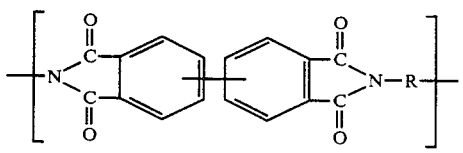

wherein R represents a divalent aromatic radical.

6. The process as claimed in claim 5, wherein said aromatic imide polymer exhibits a logarithmic viscosity of from 0.3 to 7.0 determined at a concentration of 0.5 g per 100 ml of a solvent consisting of a mixture of four parts by weight of para-chlorophenol and one part by weight of ortho-chlorophenol, at a temperature of 30° C.

7. The process as claimed in claim 5, wherein said divalent aromatic radical represented by R in the formulae (I) and (II) is selected from those of the formulae (III), (IV), (V), and (VI):

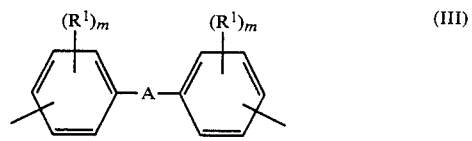

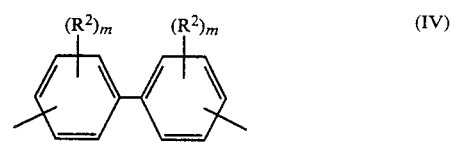

and

wherein $R^1$, $R^2$, and $R^3$ represent, independently from each other, a member selected from the group consisting of a hydrogen atom, lower alkyl radicals having 1 to 3 carbon atoms, and lower alkoxyl radicals having 1 to 3 carbon atoms; A represents a divalent linking radical selected from the class consisting of —O—, —S—, —CO—, —SO$_2$—, —SO—, —CH$_2$—, and —C(CH$_3$)$_2$—; and m represents an integer of from 1 to 4.

8. The process as claimed in claim 1, wherein said porous polymeric membrane consists of at least one aromatic imide polymer, said dissolving organic liquid (A) is selected from phenol compounds having a freezing point not higher than 100° C. and a boiling point of from 150° to 300° at ambient pressure.

9. The process as claimed in claim 8, wherein said phenol compounds are selected from the group consisting of phenol, ortho-, meta-, and para-cresols, 3.5-xylenol, carvacrol, thymol, 3-chlorophenol, 4-chlorophenol, 3-bromophenol, 4-bromophenol, 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-5-hydroxytoluene, 3-bromo-6-hydroxytoluene, and 4-bromo-2-hydroxytoluene.

10. The process as claimed in claim 1, wherein said porous polymeric membrane consists of at least one aromatic imide polymer and said shrinking organic liquid (B) is at least one member selected from the group consisting of dimethylformamide, diethylformamide, diemthylacetamide, diethylacetamide, N-methyl-2-pyrrolidone, α-chloronaphthalene, nitrobenzene, tetrachlorobenzene, aniline, alkyl benzenes having at least one alkyl substituent having 1 to 6 carbon atoms; halogenated benzenes having 1 to 2 halogen substituents; cycloaliphatic alcohols having 5 to 8 carbon atoms; and cycloaliphatic ketones having 5 to 8 carbon atoms.

11. The process as claimed in claim 10, wherein said aromatic imide polymer comprises at least 80 molar % of at least one recurring unit of the formula I:

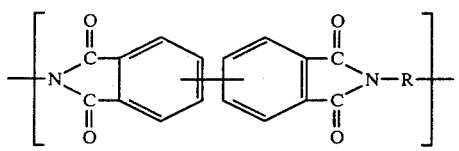

wherein R represents a divalent aromatic radical.

12. The process as claimed in claim 3, wherein said polysulfone is selected from polyarylsulfones comprising at least 80 molar % of the recurring unit of the formula (VII):

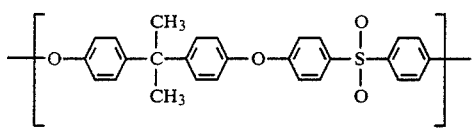

13. The process as claimed in claim 1, wherein said porous polymeric membrane consists of at least one polyarylsulfone, and said dissolving organic liquid (A) is selected from the group consisting of dichloromethylene, trichloroethylene, chloroform, tetrachloroethylene, tetrachloroethane, cyclohexanone, chlorobenzene, N-methyl-2-pyrrolidone, dimethylformamide, and dimethylacetamide; and the shrinking organic liquid (B) is selected from the group consisting of benzene, toluene, xylene, acetone, and methylethyl ketone.

14. The process as claimed in claim 1, wherein said treating liquid impregnated in at least one surface portion of said porous polymeric membrane comprises a mixture of 0.5 to 40 parts by weight of said modifying agent with 100 parts by weight of an additional organic liquid consisting essentially of at least one non-dissolving organic liquid compound which is compatible with said modifying agent but is incapable of dissolving therein the porous polymeric membrane and which has a boiling point lower than that of the modifying agent.

15. The process as claimed in claim 14, wherein said at least one surface portion of said porous polymeric membrane is impregnated with said treating liquid by immersion.

16. The process as claimed in claim 14, wherein said porous polymeric membrane consists of at least one aromatic imide polymer and said non-dissolving organic liquid compound is at least one member selected from the group consisting of benzene, cyclohexane, cyclopentane, n-pentane, n-hexane, n-heptane, n-octane, methyl alcohol, ethyl alcohol, propyl alcohols, butyl alcohols, methyl ketone, ethyl ketone, methylethyl ketone, methyl-isopropyl ketone, methyl-isoamyl ketone, methyl acetate, ethyl acetate, propyl acetate, and butyl propionate.

17. The process as claimed in claim 1, wherein application of said treating liquid is carried out by said porous polymeric membrane is impregnated with said treating liquid; by coating at least one surface of said porous polymeric membrane with said treating liquid; by causing said porous polymeric membrane to absorb the vapor of said treating liquid; and by spraying said treating liquid onto at least one surface of said porous polymeric membrane.

18. The process as claimed in claim 1, wherein said at least one surface portion of said porous membrane is impregnated with said treating liquid by impregnating said porous polymeric membrane with an organic liquid consisting essentially of at least one volatile liquid compound which is compatible with said modifying agent but is incapable of dissolving therein said porous polymeric membrane and has a boiling point lower than that of said modifying agent and then immersing and organic liquid-impregnated porous polymeric membrane in said treating liquid consisting essentially of said modifying agent alone, to replace at least a portion of the organic liquid with said modifying agent.

19. The process as claimed in claim 1, wherein said evaporating procedure of said treating liquid is carried out at a temperature of 5° to 80° C. at ambient pressure or a reduced pressure, then at a temperature of 80° to 160° C., and, finally, at a temperature of 160° to 300° C.

20. A modified polymeric membrane produced in accordance with the process as claimed in claim 1.

21. The modified polymeric membrane as claimed in claim 20 which exhibits a hydrogen gas-permeability ($PH_2$) of $1 \times 10^{-3}$ to $1 \times 10^{-7}$ cm$^3$/cm$^2$.sec.cmHg and a ratio ($PH_2$/PCO) of the hydrogen gas permeability ($PH_2$) to the carbon monoxide gas permeability (PCO) of 6 to 60.

22. The modified polymeric membrane as claimed in claim 20 which contains 0 to 10% by weight of the residual modifying agent.

23. The process of claim 1, further comprising evaporating said treating liquid by at least one procedure selected from drying and heating.

* * * * *